J. W. LAMOREAUX.
CAR BRAKE.
APPLICATION FILED DEC. 11, 1909.

951,820.

Patented Mar. 15, 1910.

Witnesses
J. H. Bishop.
Irene Lutz.

Inventor
James W. Lamoreaux.

By
Bond & Miller
Attorneys

UNITED STATES PATENT OFFICE.

JAMES W. LAMOREAUX, OF MASSILLON, OHIO.

CAR-BRAKE.

951,820.                        Specification of Letters Patent.    Patented Mar. 15, 1910.

Application filed December 11, 1909.  Serial No. 532,594.

*To all whom it may concern:*

Be it known that I, JAMES W. LAMOREAUX, a citizen of the United States, residing at Massillon, in the county of Stark and State of Ohio, have invented a new and useful Car-Brake, of which the following is a specification.

My invention relates to improvements in brakes adapted for use on railway cars, trolley cars, and similar vehicles adapted to be operated upon rails, and especially to that class of brakes known as beamless brakes; and the objects of my invention are to generally improve such brakes, to provide a simple, easily constructed, substantial and efficient brake, which will have few parts, which will adjust itself to the transverse movements of the wheels of the vehicle, which will distribute the frictional pressure in an even manner, and which will accomplish various other desirable results readily apparent to those skilled in the art. I attain these objects by the construction illustrated in the accompanying drawing, in which—

Figure 1:
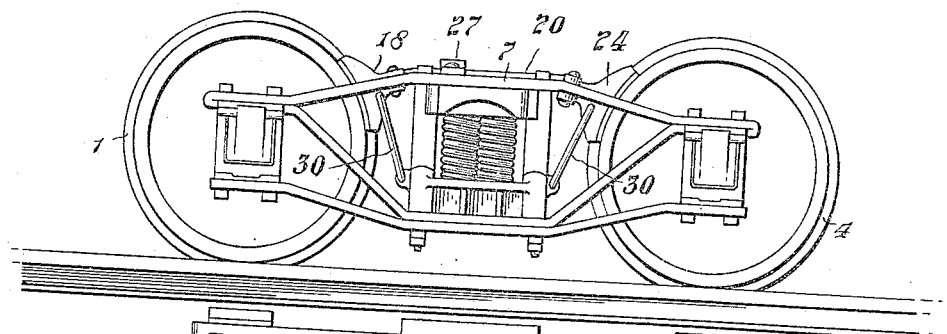
Figure 2:
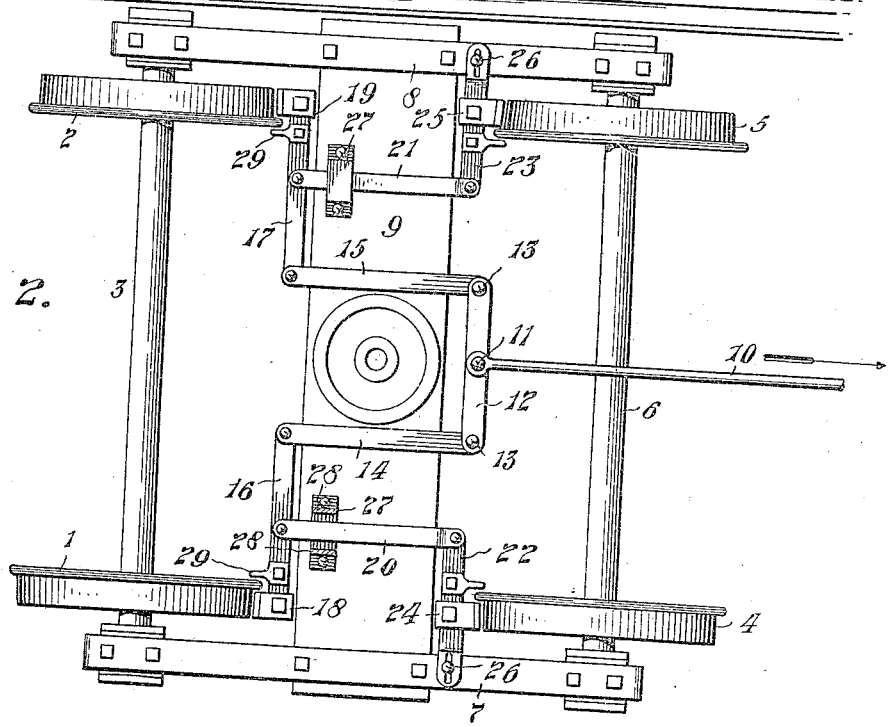
Figure 3:
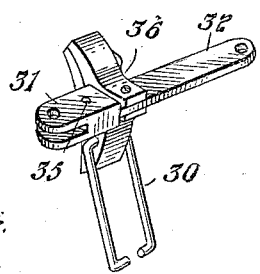
Figure 4:
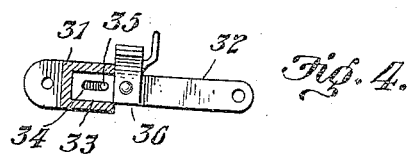

Figure 1 is a side elevation of a car truck, the wheels of which are properly mounted upon a rail, and showing a brake in connection with said truck in accordance with my invention. Fig. 2 is a top view of a car truck illustrating the arrangement of the various parts of the brake with reference to said truck and the wheels thereof. Fig. 3 is a view of a modified form of secondary brake lever. Fig. 4 is a sectional view illustrating the construction of the lever shown in Fig. 3.

Throughout the several views similar numerals of reference indicate similar parts.

The numerals 1 and 2 indicate railway wheels of ordinary construction mounted in the usual way upon the axle 3, while the numerals 4 and 5 indicate similar wheels similarly mounted upon the axle 6. The outer ends of the axles 3 and 6 are arranged in boxes or bearings of the usual construction which are mounted upon or connected to side frames preferably composed of upper and lower arch bars and a lower brace or connecting bar, such as illustrated in the drawings. In the drawings the upper arch bar upon the side of the truck where the wheels 1 and 4 are located is numbered 7 which the upper arch bar at the side of the truck where the wheels 2 and 5 are located is numbered 8. Extending from side frame to side frame across the truck is a truck bolster 9 of any suitable construction. The details of construction of the parts heretofore mentioned are in nowise claimed herein and such parts are therefore not described specifically.

The brake rod 10 is connected either immediately or intermediately with the air cylinder or other means of actuating the brake by a longitudinal movement of the said rod. The rod 10 is pivotally connected at 11 to the yoke 12 which is pivotally connected at the points 13 to the connecting links 14 and 15. The primary brake levers 16 and 17 are pivotally connected at their inner ends to the connecting links 14 and 15 respectively, while the other or outer ends of the said levers are provided with the brake heads 18 and 19 respectively to which are connected brake shoes adapted to frictionally bear against the wheels 1 and 2 in the operation of braking.

Intermediate the ends of the levers 16 and 17 the connecting bars 20 and 21 are pivotally connected, the said bars extending across the bolster 9 and being pivotally connected at their other ends to the inner ends of the secondary brake levers 22 and 23 respectively. The levers 22 and 23 are provided intermediate their ends with the brake heads 24 and 25 provided with brake shoes adapted to frictionally engage the wheels 4 and 5. At their outer ends the levers 22 and 23 are pivotally connected to the side frame, such pivotal connection being arranged to permit a longitudinal movement of the said levers 22 and 23 in a line transverse of the truck, for the purpose hereinafter to more fully appear. This pivotal connection may be accomplished by the construction illustrated in Figs. 1 and 2, where it will be seen that the outer ends of said levers are bifurcated and provided with longitudinal slots. The levers are so arranged that the upper arch bars extend between the spaced members of the bifurcated portion and a suitable bolt or pin 26 extends through the arch bar and the slots in the lever and is provided with suitable heads upon the outside of the slots in the bifurcated portion, so that the levers 22 and 23, while pivotally attached to the upper arch bars 7 and 8 by the bolts or pins are also permitted to move longitudinally in a direction transverse of the truck.

At that side of the bolster 9 adjacent the primary brake levers 16 and 17 are arranged the keepers 27 which are adapted to permit longitudinal sliding movement of the connecting bars 20 and 21, while at the same time permitting a limited transverse movement of the same. This is accomplished by spacing the side portions 28 of the holders a greater distance from each other than the width of the bars 20 and 21, as will be readily understood by those skilled in the art. The construction just described will permit a longitudinal movement of the primary levers 16 and 17 in a line transverse of the truck.

It should be understood that the construction of railway trucks is such that the axles to which the wheels are connected have some longitudinal movement transverse of the truck within their boxes or bearings. Such movement is of course limited, but is necessary for the free and practical operation of the wheels and axles in ordinary use, and especially in passing over curved portions of the track, or over switches and the like. It is obvious that a practical brake of the beamless class, in order to be satisfactory in its operation must be so constructed as to permit the brake heads and shoes to follow the wheels in their limited movements transverse of the trucks. If the construction is not so arranged the production of great friction, or the breaking of some part of the device will be inevitable. In the construction herein described the brake heads 18 and 19 will be permitted to follow the wheels 1 and 2 in their transverse movements by reason of the construction of the keepers 27 while the connection of the levers 22 and 23 to the arch bars 7 and 8, as hereinbefore described will permit the brake heads 24 and 25 to follow the wheels 4 and 5 in a similar manner. For the purpose of keeping the various brake heads in proper position with reference to their respective wheels the fingers or guides 29 are provided, which fingers may be connected to the levers as illustrated in Fig. 2 or to the brake head as illustrated in Fig. 4 as may be preferred, the sole purpose of the said fingers being to engage the flanges of the wheels to prevent the relative displacement of the brake heads.

Each brake head is maintained in proper elevated position by a support or inverted hanger 30 pivotally connected at its lower end to any suitable portion of the truck bolster. It will be noted that the brake heads are arranged at a much higher point upon the wheels than is customary in car brakes, and that practically all parts of the brake are arranged on top of the truck bolster, thus placing said parts in a position where they will be safe from injury by projections or obstructions on the road-bed. It should also be noted that if any portion of the brake should become loosened to such an extent as to hang down toward the ground, the elevated position of its remaining point of attachment will prevent the said portion from dragging along the road-bed to become entangled or to interfere with the proper operation of the wheels upon the track and in this and other ways become a menace to life and property.

In the operation of the brake, when the rod 10 is drawn in the direction indicated by the arrow in Fig. 2 movement in the same direction will be imparted through the yoke and connecting links to the inner ends of the primary brake levers 16 and 17. Said brake levers, rocking upon their pivotal connections to the bars 20 and 21, will bring the brake shoes connected to the brake heads 18 and 19 into engagement with the wheels 1 and 2. It will be understood that the pressure of said shoes against said wheels will not have become great when longitudinal sliding movement will be imparted to the connecting bars 20 and 21, which in turn will impart movement to the inner ends of the secondary brake levers 22 and 23 to throw the shoes on the brake heads 24 and 25 into engagement with the wheels 4 and 5. The pressure of the shoes against the wheels will thus be distributed, any increase in pressure upon one wheel being divided and a portion of said pressure imparted to the shoe on the other wheel on the same side of the truck. In addition to this distributing action it should be noted that by reason of the yoke 12 being pivotally connected to the rod 10 and to the links 14 and 15, that the frictional pressure will be distributed not only as between the two wheels on one side of the truck, but as between all four wheels of the truck, as will be readily understood. In the operation of the levers 16, 17, 22 and 23 the fingers 29 will serve to keep the brake heads in proper position relative to the wheels. When the brakes are set and there is any longitudinal movement of the axles 3 and 6 in a direction transverse of the truck the flanges of the wheels will engage either the fingers 29 or the brake shoes, in accordance with the direction of movement, and will shift or move the brake heads and shoes with their respective levers to accommodate the changed position of the wheels. The peculiar construction of the keepers 27, and the peculiar attachment of the levers 22 and 23 to the side frame of the truck will permit such adjustment as just described.

In the modified construction illustrated in Figs. 3 and 4 it will be noted that the secondary brake lever is composed of two telescoping members which may be termed an outer member 31 and an inner member 32 respectively. The outer member is provided with a bifurcated portion adapted to be pivotally connected to the upper arch bar of the side frame, as will be readily understood, and is provided with a recessed portion 33 open at the end, the corresponding end of the member 32 being located within said recess and adapted to slide therein, as will be readily understood from Fig. 4. The entering end of the member 32 is provided with a longitudinal slot 34 and a pin 35 extends through the portion 31 from side to side, passing through the slot 34 for the purpose of limiting the relative movement as between the members 31 and 32. The brake head 36 is connected to the portion 32 and it will be readily understood that by the means of the construction described the said brake head will be permitted to follow the transverse movements of the wheel as readily as in the case of the construction illustrated in Figs. 1 and 2. It will be obvious that it is immaterial whether the member 32 is located within the member 31 or whether the member 31 is so formed as to be located within the member 32, the only object being to provide for relative movement as between the member carrying the brake head and the side frame of the truck.

I claim:

1. In combination with a car truck provided with side frames having arch bars and a truck bolster intermediate the wheels, a brake, comprising a primary lever, a connecting bar, brake actuating means and a secondary brake lever, said primary lever provided at its outer end adjacent the side frame with a brake shoe, pivoted intermediate its ends to said connecting bar, and connected at its inner end to said brake actuating means, said connecting bar extending across said truck bolster, said secondary brake lever connected at its inner end to said connecting bar, provided intermediate its ends with a brake shoe, and operatively connected at its outer end to one of the said arch bars of the side frame.

2. In combination with a car truck provided with a truck bolster intermediate the wheels, and with side frames, a car brake comprising brake actuating means, a primary lever provided at its outer end adjacent the side frame with a brake shoe, a connecting bar extending across said truck bolster, said primary lever pivoted intermediate its ends to said bar and at its inner end to said brake actuating means, a secondary brake lever pivoted at its inner end to said connecting bar, provided intermediate its ends with a brake shoe, and operatively connected at its outer end to said side frame.

3. In a car brake, in combination with a car truck, a primary brake lever arranged on one side of the truck bolster and provided at its outer end with a brake shoe, a bar extending across the top of said bolster, said primary lever pivotally connected intermediate its ends to said bar, a secondary brake lever pivotally connected at its inner end to said bar on the opposite side of said bolster, said secondary lever provided intermediate its ends with a brake shoe, the outer end of said secondary lever connected to the side frame of the truck by connecting means adapted to permit both pivotal movement and longitudinal movement of said lever transverse of the truck, and actuating means connected to the inner end of the primary lever.

4. In a car brake, in combination with a car truck provided with side frames having arch bars, a primary brake lever arranged on one side of the truck bolster and provided at its outer end with a brake shoe, a connecting bar extending across the top of said bolster, said primary lever pivotally connected intermediate its ends to the said connecting bar, a secondary brake lever on the opposite side of said bolster, the inner end of said secondary lever pivotally connected to the said connecting bar, said secondary lever provided intermediate its ends with a brake shoe and the outer end of said lever connected to one of the arch bars of the side frame by connecting means adapted to permit both pivotal movement and longitudinal movement of said lever transverse of the truck, and actuating means connected to the inner end of the primary lever.

5. In combination with a car truck, a brake comprising a yoke, links pivotally connected to said yoke, primary brake levers arranged on one side of the truck bolster, having their inner ends pivotally connected to said links, and provided at their outer ends with brake shoes, bars extending across the top of said bolster, said primary levers pivotally connected intermediate their ends to said bars, secondary brake levers on the opposite side of said bolster, the inner ends of said secondary levers pivotally connected to said bars, said secondary levers provided intermediate their ends with brake shoes, and the outer ends of said levers connected to the side frames of the truck, the said secondary levers being adapted to pivot upon said connections with the side frames, and to move longitudinally transverse of the truck, keepers attached to said bolster, said bars arranged in said keepers and adapted to move longitudinally and also transversely therein, whereby the various brake shoes may follow the wheels in their limited normal transverse movements with reference to other portions of said truck.

In testimony that I claim the above, I have hereunto subscribed my name in the presence of two witnesses.

JAMES W. LAMOREAUX.

Witnesses:
   IRENE PAROZ,
   GEO. W. KRATSCH.